(12) United States Patent
Kawasaki et al.

(10) Patent No.: US 6,473,186 B2
(45) Date of Patent: Oct. 29, 2002

(54) SCANNING WIDE-AREA SURFACE SHAPE ANALYZER

(75) Inventors: Kazuhiko Kawasaki, Ushiku (JP); Naoki Mitsutani, Davis, CA (US); Hiroshi Haino, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/859,452

(22) Filed: May 18, 2001

(65) Prior Publication Data

US 2002/0018216 A1 Feb. 14, 2002

(30) Foreign Application Priority Data

May 22, 2000 (JP) .......................................... 2000-149633

(51) Int. Cl.$^7$ ............................................... G01B 11/02
(52) U.S. Cl. ........................................................ 356/512
(58) Field of Search .................................. 356/512–514, 356/489, 495, 601, 604; 250/548, 559.29

(56) References Cited

U.S. PATENT DOCUMENTS 5,260,761 A * 11/1993 Barker ......................... 356/4.5
5,355,221 A * 10/1994 Cohen et al. ................ 356/359
6,401,349 B1 * 6/2002 Onyon ........................... 33/551

OTHER PUBLICATIONS

"Flatness Measurement By UV Moire Technique" by Hisatoshi Fujiwara et al.; SPIE vol. 3478; Jul. 1998; pp. 444–447.

"Profile Evaluation Of Large Mirrors By Multiple Aperture Synthetic Interferometry: Estimation And Removal Of Accumulative Error" by Jun–ichi Kato et al.; No. 17 (1995); pp. 119–121 (English Portion and Figures).

"High Precision Flatness Testing Of A Large X–Ray Mirror Using A Scanning Interferometer" by Eiji Aoki et al.; No. 15 (1993); pp. 165–167 (English Portion and Figures).

* cited by examiner

Primary Examiner—Jordan M. Schwartz
(74) Attorney, Agent, or Firm—Oliff & Berridge, PLC

(57) ABSTRACT

A scanning wide-area surface shape analyzer drastically shortens a time period required for measuring the surface shape of a surface to be inspected. A scanner moves the measuring head in parallel with a flat surface for the measuring head to acquire the measured image data. An attitude-varying mechanism varies the acquisition attitude of the measuring head for acquiring the measured image data. An image processing control device analyzes and calculates the surface shape of an acquisition area corresponding to the acquisition position and in the acquisition attitude. The image processing control device controls driving of the scanner and the attitude-varying mechanism, calculates the next acquisition position by using measured image data acquired at the present acquisition position and in the present acquisition attitude, and calculates an acquisition attitude to be taken at the calculated next acquisition position.

8 Claims, 11 Drawing Sheets

SCANNING WIDE-AREA SURFACE SHAPE ANALYZER

BACKGROUND OF THE INVENTION

1. Field of the Invention

This invention relates to a scanning wide-area surface shape analyzer as measuring means incorporating an interferometer for scanning a surface to be inspected to calculate a surface shape thereof.

2. Prior Art

As a method of measuring the surface shape of a surface to be inspected having a generally planer shape with high accuracy, there has been proposed one in which a beam emitted from a light source is projected by an interferometer on a reference surface and a surface to be inspected having a generally planer shape to thereby generate an optical interference fringe image formed by interference between reflected light from the reference surface and reflected light from the surface to be inspected, and the surface shape of the surface to be inspected is measured by using the optical interference fringe image. According to this method using an interferometer, although it is possible to measure the surface shape of a surface to be inspected with high accuracy, if the surface to be inspected has an observation area having undulations of a few $\mu$m or more in a vertical direction, the number of fringes in the area increases, thereby making it difficult to measure the surface to be inspected.

Generally, as the area of a surface to be inspected increases, the amount of vertical undulation thereof also increases. To measure the surface shape of a broad surface to be inspected having large vertical undulations, it is required to use a scanning-type apparatus incorporating a scanner for moving an interferometer relative to the observation area of the surface to be inspected. However, this scanning-type apparatus as well undergoes measurement constraints related to the amount of vertical undulation.

To use an interferometer for measuring the surface shape of a surface to be inspected with accuracy, it is preferable to hold the interferometer in an attitude in which the reference surface of the interferometer and the surface to be inspected are parallel or approximately parallel with each other. In other words, the number of interference fringes included in the obtained interference fringe image represents the attitude of the interferometer relative to the surface to be inspected for data acquisition therefrom, and it is thus desired that the number of interference fringes is equal to or smaller than the number corresponding to the required measurement accuracy.

One will contemplate that an apparatus for measuring the surface shape of a broad surface to be inspected by using an interferometer that can meet this desire should include a scanner for moving the interferometer-relative to the surface to be inspected, and an acquisition attitude-varying device which is capable of changing the attitude of the interferometer relative to the surface to be inspected such that the reference surface and the surface to be inspected are parallel or approximately parallel with each other. In this apparatus, when the surface shape of a broad surface to be inspected is measured, a preparatory measurement is carried out to obtain optical interference fringes the number of which is equal to or smaller than a predetermined number, and a control variable for the attitude control for obtaining optical interference fringes such that the number of fringes is made smaller than the predetermined number is calculated for each acquisition area for acquiring image data obtained by the preparatory measurement. Then, an actual measurement is carried out while the attitude of the interferometer is controlled by using the calculated control variable for the attitude control.

The above-mentioned apparatus, however, requires execution of not only a preparatory measurement of the same surface to be inspected for obtaining a equal or smaller number of interference fringes to or than a predetermined number but also to an actual measurement while controlling the attitude of the interferometer by using the control variable for the attitude control. Therefore, it takes an increased or doubled time period to measure the surface shape of the surface to be inspected

SUMMARY OF THE INVENTION

It is an object of the present invention to provide a scanning wide-area surface shape analyzer which is capable of drastically shortening a time period required for measuring the surface shape of a surface to be inspected.

To attain the above object, the present invention provides a scanning wide-area surface shape analyzer comprising an optical table having a flat surface for placing an object to be inspected thereon, measuring means having a light source, a reference surface, and an interferometer which projects a beam emitted from the light source onto the reference surface and an surface to be inspected of the object placed on the flat surface, thereby generating an optical interference fringe image formed by interference between reflected light from the reference surface and reflected light from the surface to be inspected, the measuring means acquiring the optical interference fringe image generated by the interferometer as measured image data, scanning means having a scanning reference position thereof set to a point of intersection between an optical axis of the beam and the reference surface in the measuring means, for moving the measuring means in parallel with the flat surface such that the scanning reference position sequentially reaches each acquisition position used for the measuring means to acquire the measured image data, attitude varying means for varying an acquisition attitude of the measuring means for acquiring the measured image data, such that a direction of inclination of a reference axis being a direction vector extending along the optical axis from the scanning reference position is changed relative to the surface to be inspected, surface shape analyzing and calculating means for analyzing and calculating, based on the measured image data acquired at the acquisition position and in the acquisition attitude, a surface shape of an acquisition area corresponding to the acquisition position and the acquisition attitude, in the surface to be inspected, and control means for controlling driving of the scanning means and the attitude-varying means, and the control means calculates a next acquisition position by using measured image data acquired at a present acquisition position and in a present acquisition attitude, and calculates an acquisition attitude to be taken at the calculated next acquisition position.

According to the above construction, as is distinct from the conventional analyzer, there is no need to execute a preparatory measurement for obtaining the control variable of the measuring means, which makes it possible to drastically shorten a time period required for measuring the surface shape of an surface to be inspected.

Preferably, the control means obtains a position corresponding to an end position of the acquisition area in the surface to be inspected on a scanning line extending from the present acquisition position in a direction of scanning of the measuring means, based on a surface shape of the acquisition area in the surface to be inspected, which has been determined from the measured image data acquired at the present acquisition position and in the present acquisition attitude, and the control means calculates the next acquisition position such that a distance from the present acquisition position to the next acquisition position becomes not more than two times as large as a distance from the present acquisition area to the obtained position corresponding to the end position of the acquisition area in the surface to be inspected.

By thus calculating the next acquisition position, an overlapping area is positively made to exist between a acquisition area corresponding to the present acquisition position and an acquisition area corresponding to the next acquisition position, thereby preventing occurrence of an unmeasured area on the surface to be inspected.

Preferably, the control means calculates a perpendicular vector at a point of intersection between a line drawn from the calculated next acquisition position toward the acquisition area in the surface to be inspected or toward an extended area of the acquisition area, and the acquisition area or the extended area of the acquisition area, the line extending parallel with the reference axis at the present acquisition position and in the present acquisition attitude, the acquisition area corresponding to the measured image data acquired at the present acquisition position and in the present acquisition attitude, and the control means sets a direction of inclination of the reference axis which becomes coincident or parallel with the calculated perpendicular vector, to the acquisition attitude at the next acquisition position.

By thus determining the acquisition attitude at the next acquisition position, it is possible to hold the measuring means in an acquisition attitude in which the reference surface of the interferometer in the measuring means and a corresponding acquisition area on the surface to be inspected are substantially parallel with each other.

More preferably, when the measuring means is moved to the next acquisition position, if a position to which the measuring means has been moved is slightly different from the calculated next acquisition position, the control means calculates a perpendicular vector at a point of intersection between a line drawn from the position to which the measuring means has been moved, toward the acquisition area in the surface to be inspected or toward an extended area of the acquisition area, and the acquisition area, the line extending parallel with the reference axis at the present acquisition position and in the present acquisition attitude, the acquisition area corresponding to the measured image data acquired at the present acquisition position and in the present acquisition attitude, and the control means sets a direction of inclination of the reference axis which becomes coincident or parallel with the calculated perpendicular vector, to the acquisition attitude at the next acquisition position.

By thus determining the acquisition attitude at the next acquisition position, if the measuring means is moved to a position slightly different from the calculated next acquisition position, it is possible to correct the acquisition attitude of the measuring means.

Preferably, the control means determines a point of intersection between a line drawn from the calculated next acquisition position toward the acquisition area in the surface to be inspected and the acquisition area, the acquisition area corresponding to the measured image data acquired at the present acquisition position and in the present acquisition attitude, the line extending parallel with the reference axis at the present acquisition position and in the present acquisition attitude, calculates a least squares approximate surface based on the determined point of intersection and points close thereto, and sets a direction of inclination of the reference axis which becomes coincident or parallel with a normal vector on the calculated least squares approximate surface, to the acquisition attitude at the next acquisition position.

By thus determining the acquisition attitude at the next acquisition position, it is possible to calculate a normal vector which represents a perpendicular direction to a plane in the acquisition area with higher accuracy without being adversely affected by uneven high-frequency components which might be contained in measured data acquired from the acquisition area. In other words, it is possible to further increase the parallelism of the reference surface of the interferometer in the measuring means with a corresponding acquisition area on the surface to be inspected.

Preferably, after the measuring means has been positioned to the next acquisition position, the control means calculates a number of optical interference fringes indicated by measured image data acquired at the next acquisition position, based on the measured image data, and sets an acquisition attitude in which the number of optical interference fringes becomes equal to or smaller than a predetermined number, to the acquisition attitude at the next acquisition position.

By thus determining the acquisition attitude at the next acquisition position, it is possible to obtain an appropriate acquisition attitude to be taken at the next acquisition position.

Preferably, the surface shape analyzing and calculating means has an intermediate-area surface shape calculation function of calculating a surface shape of an overlapping area portion where two adjacent ones of acquisition areas corresponding to measured image data acquired at respective acquisition positions overlap, and the intermediate-area surface shape calculation function comprises synthesizing surface shapes of the two adjacent ones of the acquisition areas, to thereby calculate the surface shape of the overlapping area portion.

By thus calculating the surface shape of the overlapping area portion, from the result of measurement of the surface to be inspected provides, it is possible to obtain a surface shape of the overlapping area portion of two adjacent acquisition areas, which is smooth and has no discontinuity.

More preferably, the overlapping area portion whose surface shape is calculated by the intermediate-area surface shape calculation function exists between a first position corresponding to an acquisition position of one of the two adjacent ones of the acquisition areas and a second position corresponding to an acquisition position of another of the two adjacent ones of the acquisition areas, and the intermediate-area surface shape calculation function comprises calculating a surface shape at an object position between the first position in the one acquisition area and the second position in the another acquisition area, by synthesizing a surface shape of the one acquisition area and a surface shape of the another acquisition area by using a weighting factor defined by a ratio between a distance from the first position in the one acquisition area to the object position and a distance from the object position to the second position in the another acquisition area.

By thus calculating the surface shape of the overlapping area portion, it is possible to determine a surface shape in the overlapping area portion of two adjacent acquisition areas, which is smooth and has no discontinuity, and facilitate the calculation of the surface shape.

DETAILED DESCRIPTION OF PREFERRED EMBODIMENTS

The present invention will now be described in detail with reference to drawings showing embodiments thereof.

(First embodiment)

Figure 1:
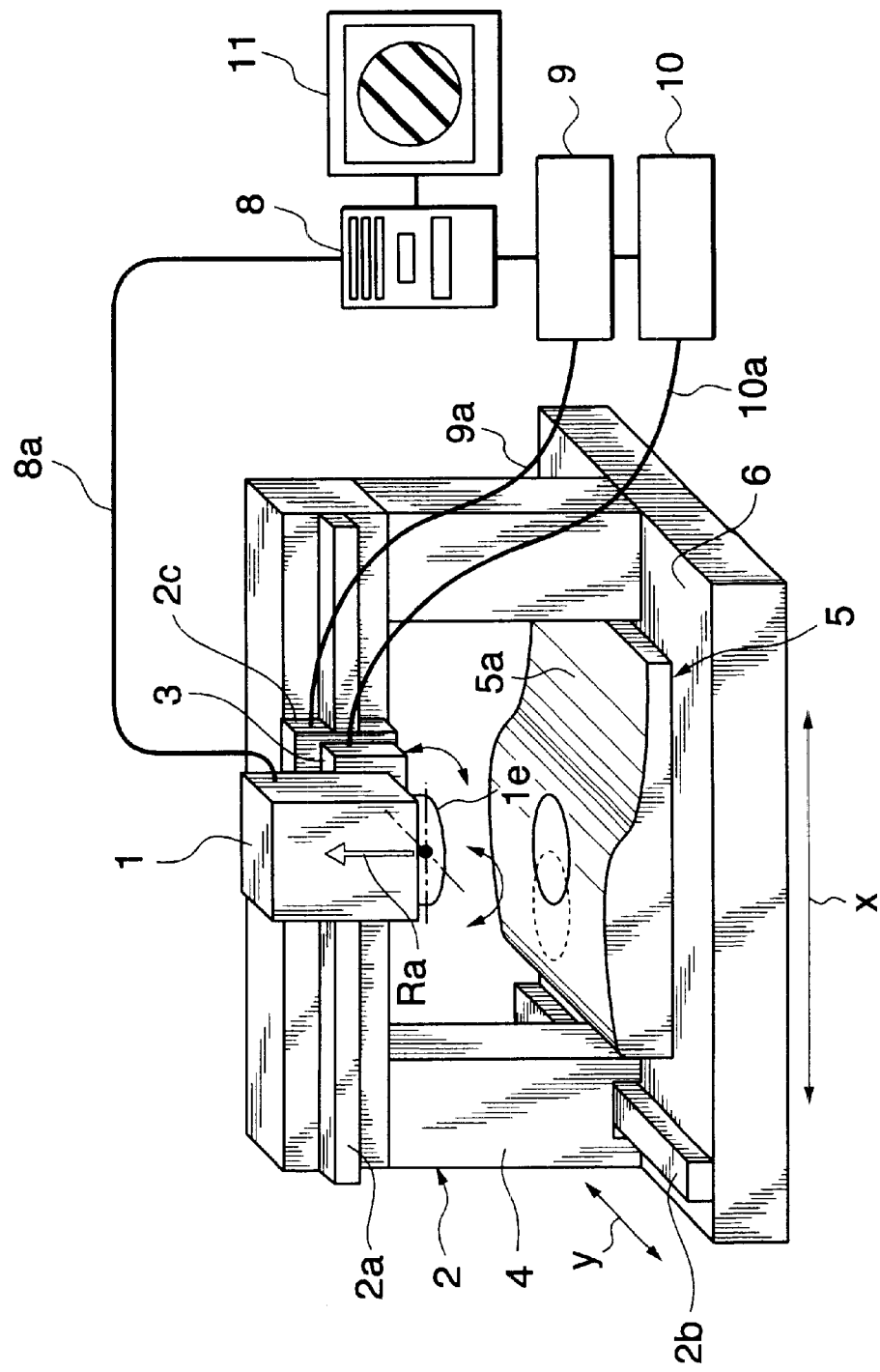
FIG. 1 is a perspective view schematically showing the arrangement of a scanning wide-area surface shape analyzer according to a first embodiment of the present invention.
Figure 2:
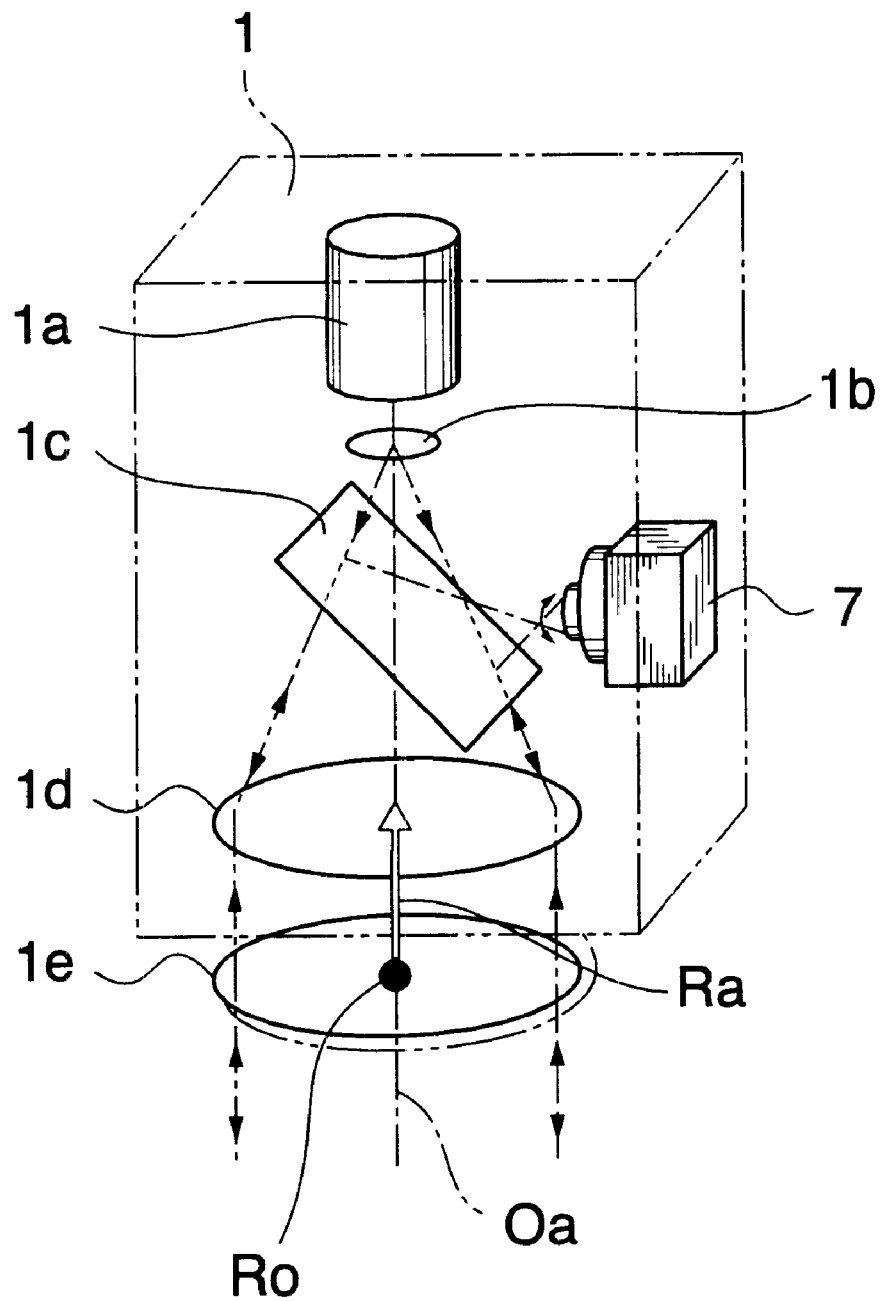
FIG. 2 is a perspective view showing the construction of a measuring head which is mounted in the scanning wide-area surface shape analyzer of FIG. 1.

FIG. 1 is a perspective view schematically showing the arrangement of a scanning wide-area surface shape analyzer according to a first embodiment of the present invention. FIG. 2 is a perspective view showing the construction of a measuring head mounted in the FIG. 1 scanning wide-area surface shape analyzer.

Referring to FIG. 1, the scanning wide-area surface shape analyzer is comprised of an optical table 6 having an upper surface thereof formed with a flat surface, a measuring head 1 for acquiring measured image data to determine the surface shape of a surface to be inspected 5a of an object to be inspected 5 placed on the flat surface of the optical table 6, a scanner 2 for sequentially moving the measuring head 1 into data acquisition positions in parallel with the flat surface of the optical table 6 such that the measuring head 1 can scan the surface 5a of the object 5, and an attitude-varying mechanism 3 which is capable of varying the acquisition attitude of the measuring head 1 when the measuring head 1 acquires measured image data at each acquisition position.

As shown in FIG. 2, the measuring head 1 incorporates an interferometer which is constructed such that a beam from a light source 1a is projected onto a reference surface 1e and the surface to be inspected 5a (shown in FIG. 1) having a generally planar shape, through a lens 1b, a beam splitter 1c, and a lens 1d, thereby generating an optical interference fringe image formed by interference between reflected light from the reference surface 1e and reflected light from the surface 5a, and data acquisition means 7 for acquiring the optical interference fringe image generated by the interferometer.

Referring again to FIG. 1, the scanner 2 includes a support block 4 which is configured such that it can drive itself in the y direction along a guide rail 2b arranged on the optical table 6. The support block 4 carries on its top a guide rail 2a extending in the x direction orthogonal to the y direction. A moving table 2c is movably supported on the guide rail 2a. The moving table 2c includes a drive source, not shown, which enables the moving table 2c to travel by itself in the x direction along the guide rail 2a. The movement of the support block 4 of the scanner 2 causes the measuring head 1 to scan the surface to be inspected 5a in the y direction, while the movement of the moving table 2c causes the measuring head 1 to scan the surface 5a in the x direction. By this scanning, the measuring head 1 is moved to a corresponding acquisition position, wherein a point of intersection R0 between the optical axis Oa of the measuring head 1 and the reference surface 1e coincides with the corresponding acquisition position.

The moving table 2c carries the attitude-varying mechanism 3 mounted thereon. The attitude-varying mechanism 3 is capable of varying the data acquisition attitude of the measuring head 1 by causing the measuring head 1 to swing about a starting point R0 of a reference axis Ra. Here, as shown in FIG. 2, the intersection point of the optical axis Oa of the beam from the light source 1a in the measuring head 1 with the reference surface 1e is determined as the starting point R0, and the reference axis Ra is represented by a direction vector extended along the optical axis Oa. The direction of inclination of the reference axis Ra relative to the flat surface of the optical table 6 represents a data acquisition attitude relative to the surface to be inspected 5a, which the measuring head 1 assumes to acquire measured image data from the surface to be inspected 5a.

Measured image data acquired by the data acquisition means 7 of the measuring head 1 is input to an image processing control device 8 through a cable 8*a*. The image processing control device 8 is implemented e.g. by a computer including a CPU, a memory, and an interface. The image processing control device 8 carries out a surface shape analysis calculation process for analyzing the input measured image data and calculating the surface shape of the acquisition area corresponding to the image data, in the surface to be inspected. Further, the image processing control device 8 carries out scanning attitude control for controlling the acquisition position and acquisition attitude of the measuring head 1. More specifically, in the scanning attitude control, measured image data obtained at the present acquisition position and in the present acquisition attitude or the surface shape of the surface to be inspected calculated based on the measured image data is used to calculate the next acquisition position, and an acquisition position control signal is generated for driving the moving table 2*c* such that the intersection point R0 of the optical axis Oa of the beam in the measuring head 1 with the reference surface 1*e* is moved to the calculated next acquisition position. Further, the measured image data obtained at the present acquisition position and in the present acquisition attitude or the surface shape of the surface to be inspected calculated based on the measured image data is used to calculate an acquisition attitude to be taken in the next acquisition position, and an acquisition attitude control signal is generated for driving the attitude-varying mechanism 3 such that the reference axis Ra in the measuring head 1 agrees with the calculated acquisition attitude. The acquisition position control signal is input to a scanning driver 9, while the acquisition attitude control signal is input to an attitude-varying driver 10. The image processing control device 8 has a monitor 11 connected thereto which is capable of selectively displaying measuring conditions set or determined, an optical interference fringe image acquired as measured image data, a surface shape calculated based on the measured image data.

The scanning driver 9 generates a driving signal based on the input acquisition position control signal, for driving the moving table 2*c* such that the intersection point of the optical axis Oa of the beam in the measuring head 1 with the reference surface 1*e* is moved to the next acquisition position. The driving signal is delivered to the moving table 2*c* of the scanner 2 through a signal cable 9*a*.

The attitude-varying driver 10 generates a driving signal based on the input acquisition position control signal, for driving the attitude-varying mechanism 3 such that the reference axis Ra in the measuring head 1 agrees with the calculated acquisition attitude. The driving signal is delivered to the attitude-varying mechanism 3 through a signal cable 10*a*.

Figure 3:
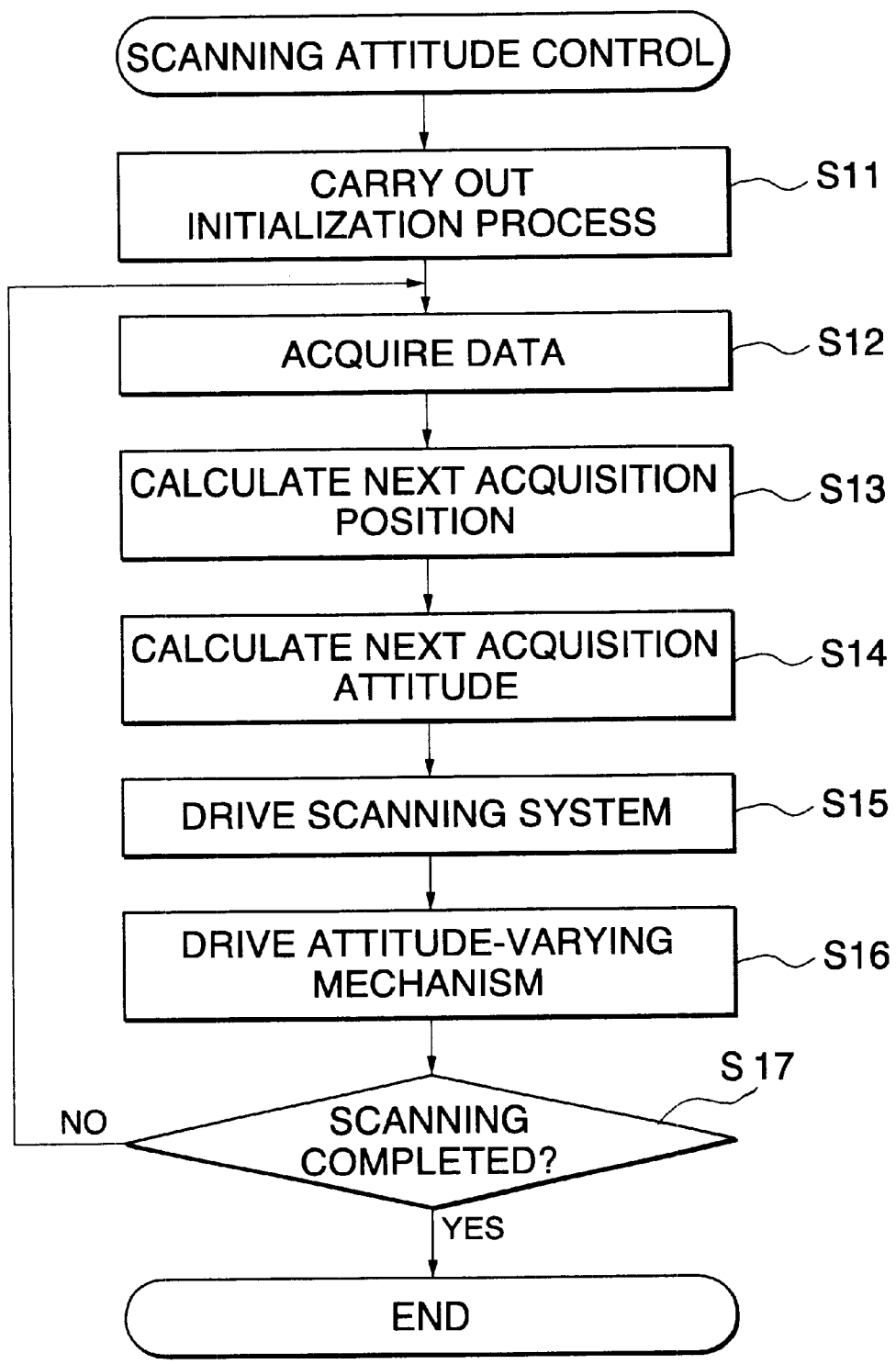
FIG. 3 is a flowchart showing the procedure of a scanning attitude control process executed by the FIG. 1 scanning wide-area surface shape analyzer.
Figure 4:
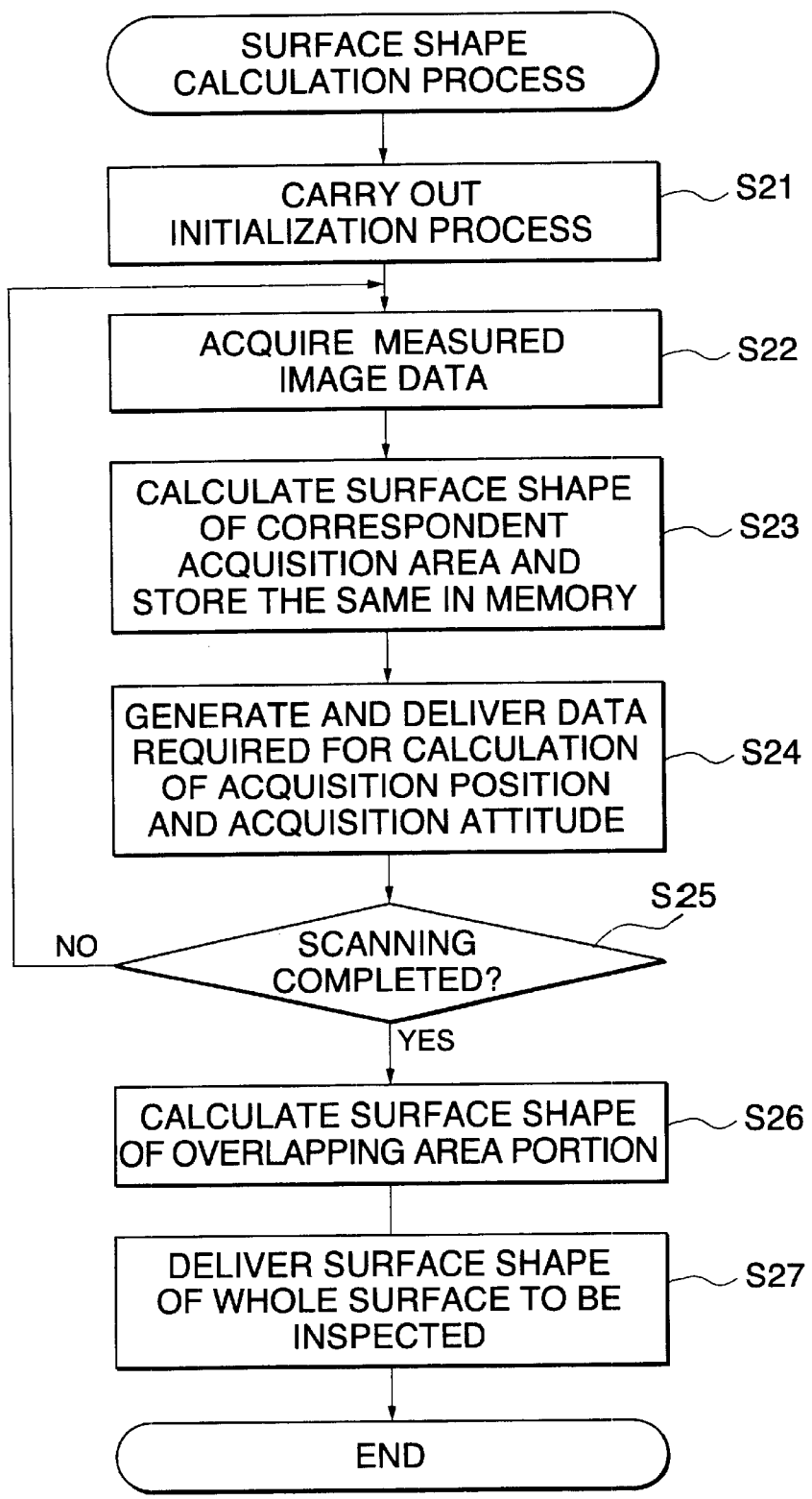
FIG. 4 is a flowchart showing the procedure of a surface shape calculation process executed by the FIG. 1 scanning surface shape analyzer.
Figure 5A:
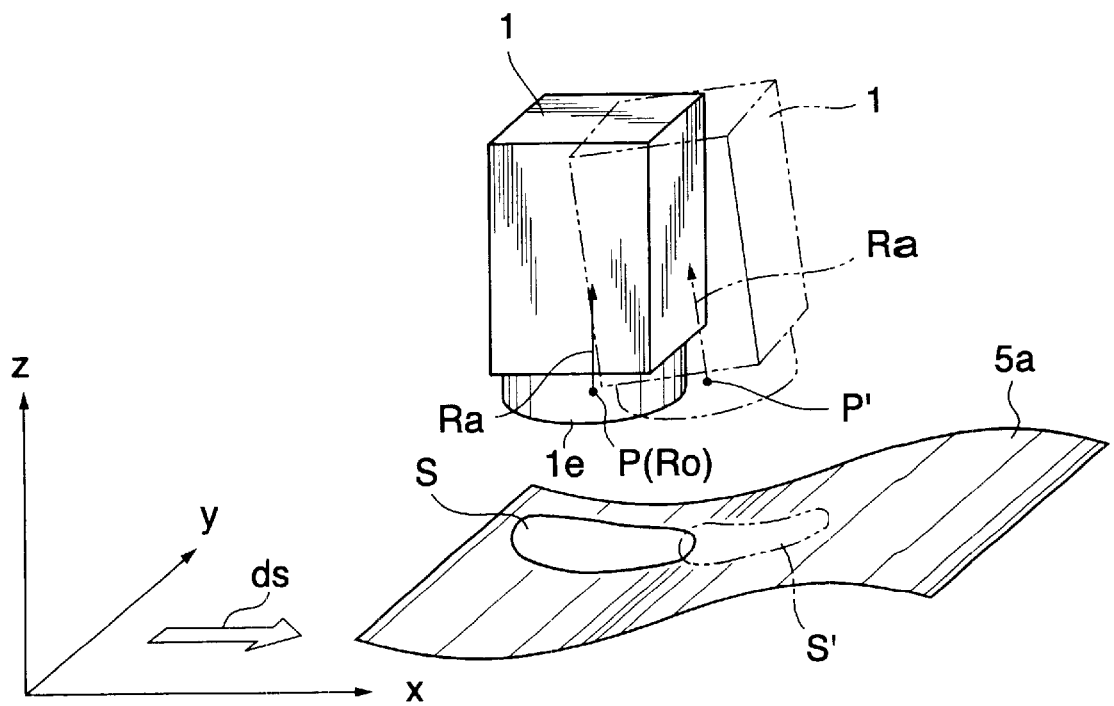
FIG. 5A is a diagram schematically showing the relationship between the acquisition position and acquisition attitude of the measuring head and a surface to be inspected, in the FIG. 1 scanning surface shape analyzer.
Figure 5B:
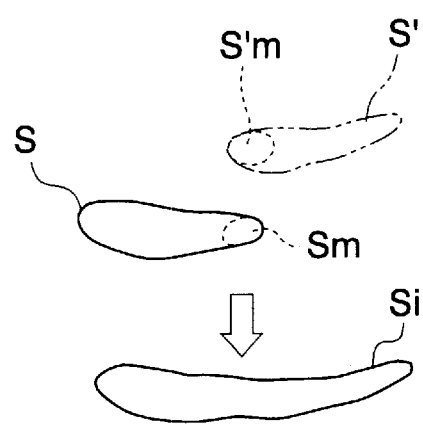
FIG. 5B is a diagram schematically showing a method of synthesizing and calculating the surface shapes of two adjacent acquisition areas having overlapping area portions, which is carried out by the FIG. 1 scanning surface shape analyzer.
Figure 6:
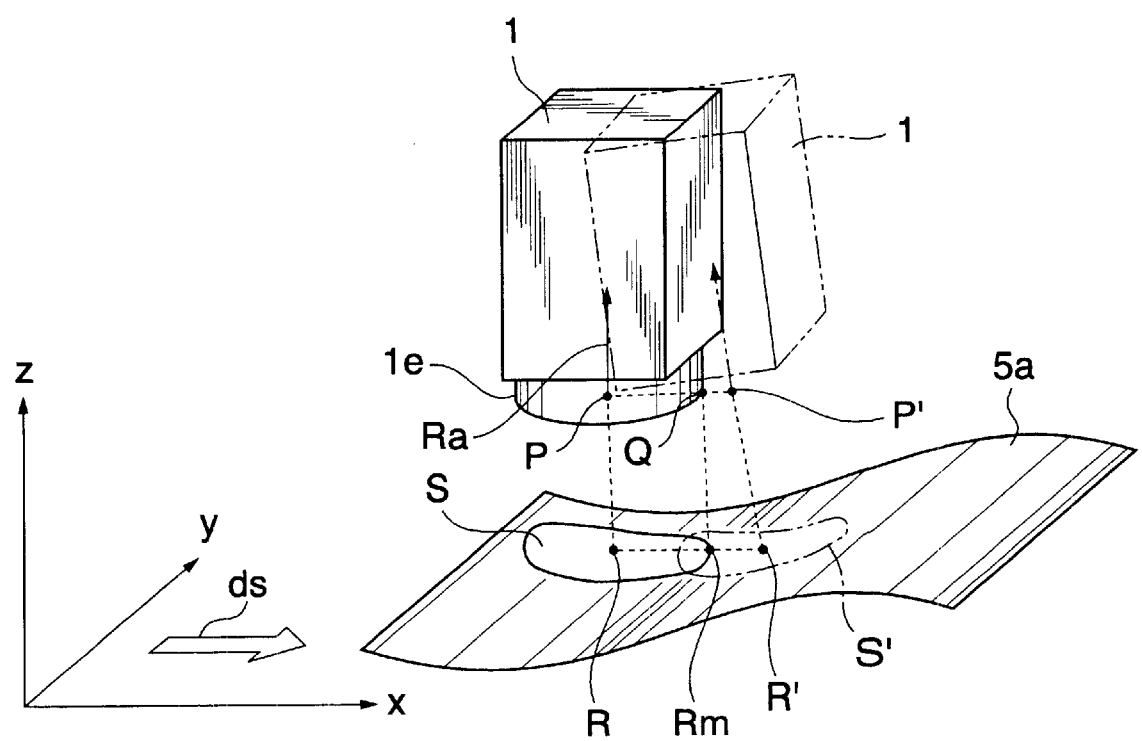
FIG. 6 is a diagram schematically showing a method of calculating a next acquisition position of the measuring head, which is carried out by the FIG. 1 scanning surface shape analyzer.
Figure 7:
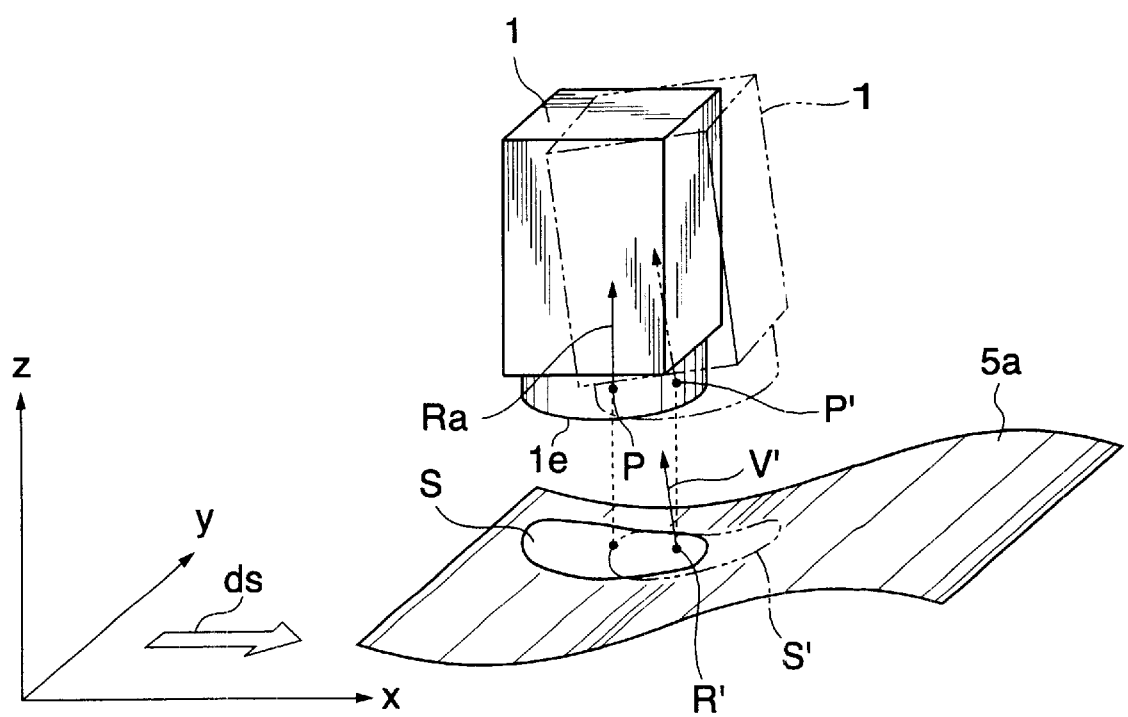
FIG. 7 is a diagram schematically showing a method of calculating an acquisition attitude at the next acquisition position of the measuring head, which is carried out by the FIG. 1 scanning surface shape analyzer.
Figure 8:
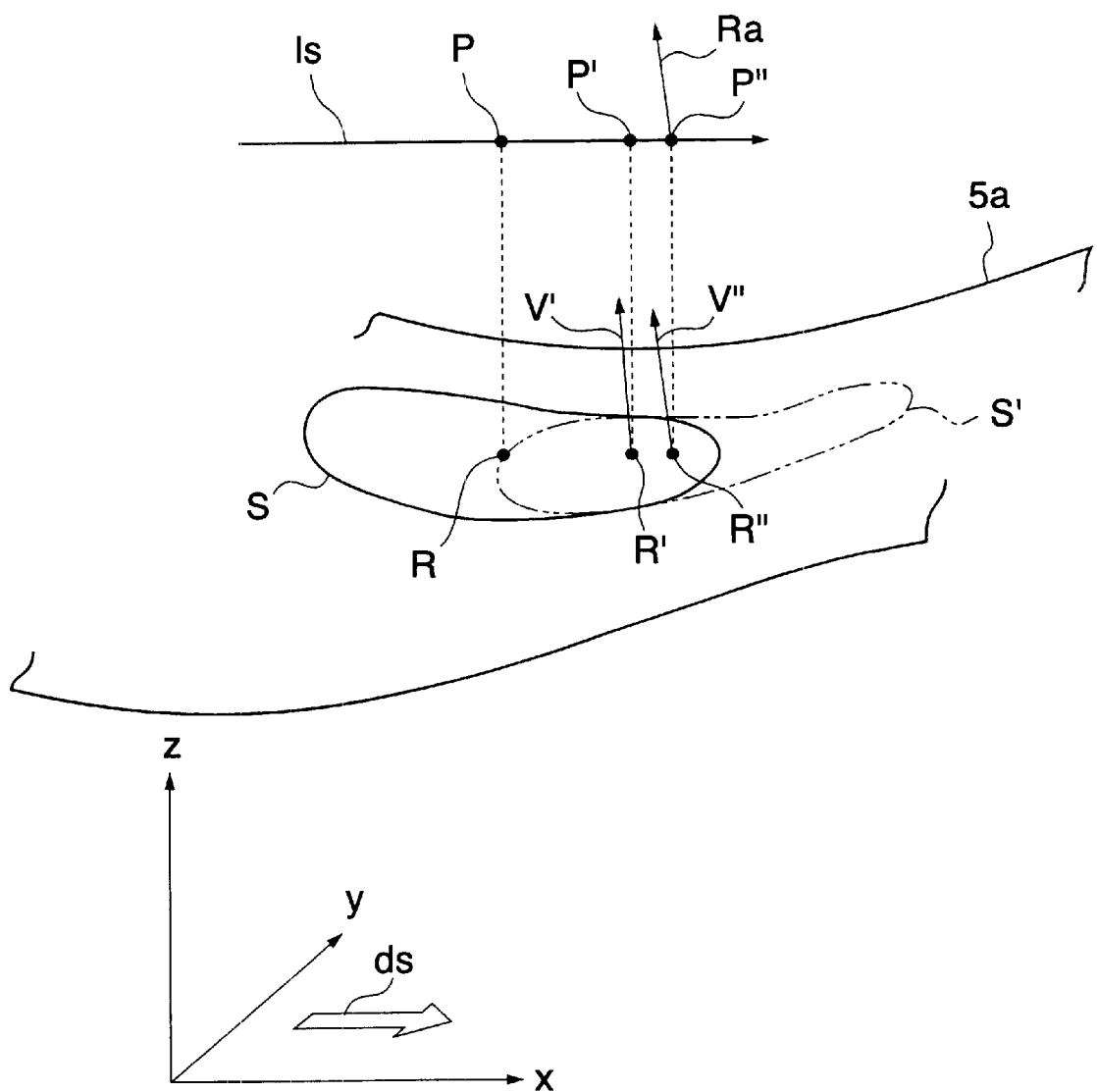
FIG. 8 is a diagram schematically showing a method of calculating an acquisition attitude at the next acquisition position of the measuring head, which is carried out by the FIG. 1 scanning surface shape analyzer.
Figure 9:
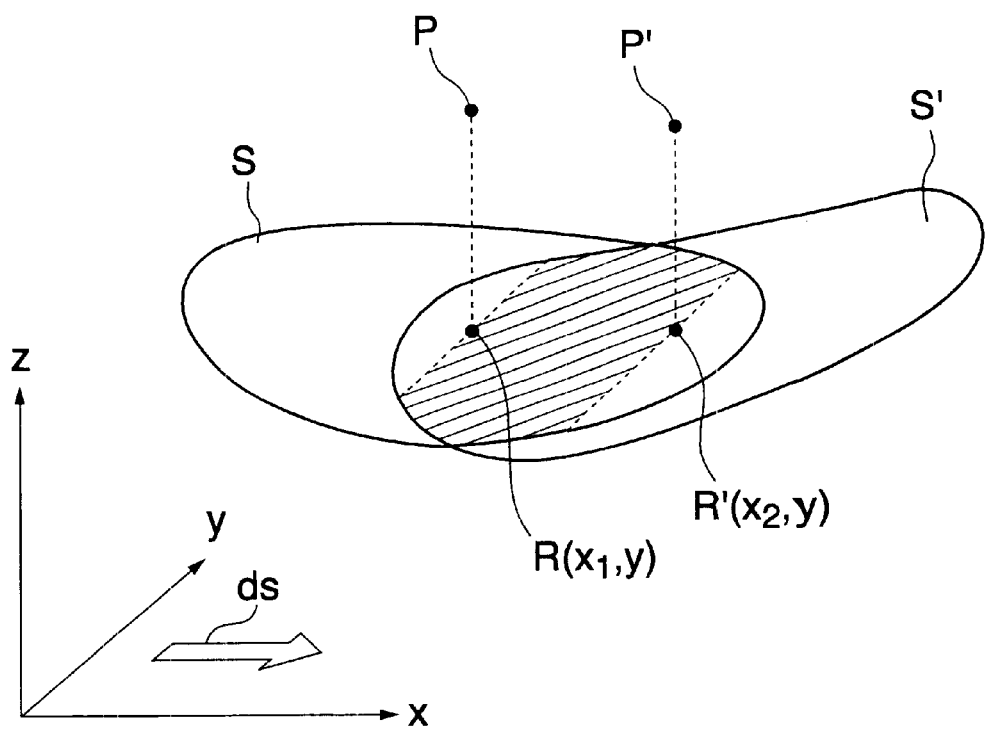
FIG. 9 is a diagram schematically showing a method of calculating the surface shape of overlapping area portions of two adjacent acquisition areas, which is carried out by the FIG. 1 scanning surface shape analyzer.

Next, a measuring operation by the scanning wide area surface shape analyzer according to the present embodiment will be described with reference to FIGS. 3 to 9. FIG. 3 is a flowchart showing the procedure of a scanning attitude control process executed by the FIG. 1 scanning wide-area surface shape analyzer. FIG. 4 is a flowchart showing the procedure of a surface shape calculation process executed by the FIG. 1 scanning surface shape analyzer. FIG. 5A is a diagram schematically showing the relationship between the acquisition position and acquisition attitude of the measuring head and a surface to be inspected, in the FIG. 1 scanning surface shape analyzer. FIG. 5B is a diagram schematically showing a method of synthesizing and calculating the surface shapes of two adjacent ones of acquisition areas having overlapping area portions in the analyzer, which is carried out by the FIG. 1 scanning surface shape analyzer. FIG. 6 is a diagram schematically showing a method of calculating the next acquisition position of the measuring head, which is carried out by the FIG. 1 scanning surface shape analyzer. FIGS. 7 and 8 are diagrams schematically showing a method of calculating an acquisition attitude at the next acquisition position of the measuring head, which is carried out by the FIG. 1 scanning surface shape analyzer. FIG. 9 is a diagram schematically showing a method of calculating the surface shape of overlapping area portions of two adjacent acquisition areas, which is carried out by the FIG. 1 scanning surface shape analyzer.

Referring to FIG. 5A, in the scanning wide-area surface shape analyzer, three-dimensional coordinates (x, y, z) are defined in advance in which the flat surface of the optical table 6 is an x-y plane and the direction of height thereof is the z direction, and the moving table 2*c* is moved in parallel with the flat surface of the optical table 6 with the x direction, that is, the direction ds (indicated by an arrow in the figure) of scanning for measurement of the measuring head 1 being set as a main scanning direction. Further, the y direction is set as a sub scanning direction, and sub scanning is carried out by moving the support block 4 along the guide rail 2*b*.

Here, if the z coordinate value of the starting point R0 of the reference axis Ra in the measuring head 1 is set to z0 (=a fixed value), the coordinate value z0 of the starting point RO is not varied by scanning executed by the measuring head 1, so that the acquisition position of the measuring head 1 is constantly represented by coordinate values (x, y, z0). In other words, if the coordinate values of the present acquisition position P are set to (x, y, z0), the measuring head 1 is positioned such that the coordinate values of the starting point RO of the measuring head 1 coincide with the coordinate values of the acquisition position P. Further, the inclination of the reference axis Ra in the measuring head 1 represents the acquisition attitude of the measuring head 1, and in the present acquisition position P, the reference axis Ra in the measuring head 1 is inclined in a direction corresponding to the acquisition attitude with respect to the starting point R0.

After measured image data is acquired by the measuring head 1 in the present acquisition position P and the present acquisition attitude, the surface shape of an acquisition area S corresponding to the present acquisition position P and the present acquisition attitude, in the surface to be inspected 5*a*, is calculated based on the measured image data. Then, the next acquisition position P' is calculated based on the calculated surface shape of the acquisition area S, and the measuring head 1 is moved such that the starting point R0 thereof becomes coincident with the next acquisition position P'. Further, the next acquisition attitude of the measuring head 1 at the next acquisition position P' is calculated such that the reference axis Ra is approximately perpendicular to the acquisition area S having a surface shape acquired at the present acquisition position P.

After the next acquisition position P' and the next acquisition attitude are thus calculated, the measuring head 1 is moved to the next acquisition position P', while the acquisition attitude is changed to the calculated next acquisition attitude. Then, measured image data is acquired by the measuring head 1 which is held in the next acquisition attitude and the next acquisition position P', and the surface shape of an acquisition area S' corresponding to the next acquisition position and the next acquisition in the surface to be inspected 5*a* is calculated based on the measured image data acquired at the next acquisition position P'. In this way, the measuring head 1 is sequentially moved to acquisition positions, and the acquisition attitude (reference axis Ra)

thereof is varied at each acquisition position, whereby measured image data is acquired by the measuring head 1 which is held in an acquisition attitude corresponding to each acquisition position P.

After scanning of the surface to be inspected 5a has been completed, the surface shape of an acquisition area corresponding to each acquisition position have been obtained, and then the surface shape of the whole surface to be inspected 5a is calculated from the surface shapes of the acquisition areas. To calculate the surface shape of the whole surface to be inspected 5a based on the surface shapes of the acquisition areas, e.g. as shown in FIG. 5B, the surface shapes of overlapping area portions of two adjacent ones S and S' of the acquisition areas are synthesized and then the whole surface shape of the two adjacent areas S and S' is calculated. More specifically, the surface shapes of the overlapping area portions Sm and S'm of the two adjacent acquisition areas are synthesized to thereby calculate the surface shape of the overlapping area portion of the two adjacent acquisition areas S and S'. Then, the surface shape Si of an area consisting of the two adjacent acquisition areas S and S' is calculated.

Next, a method of calculating the next acquisition position P' will be described with reference to FIG. 6. As shown in the figure, in the present embodiment, if the present acquisition position of the measuring head 1 is designated by P, and an acquisition area on the surface to be inspected 5a whose measured image data is acquired at the present acquisition position P is designated by S, a position R corresponding to the present acquisition position P on the acquisition area S is determined, and then a point Rm is determined at which a straight line extending from the position R in the direction ds of scanning for measurement of the measuring head 1 meets a boundary of the acquisition area S. Then, a point Q on the reference surface 1e, which corresponds to the point Rm on the straight line extending from the acquisition position P in the direction ds is determined to calculate a distance |P–Q| from the acquisition position P to the point Q. Then, if the next acquisition position is designated by P', an arbitrary acquisition position which establishes a relationship indicated by the following equation (1) between a distance |P–P'| from the present acquisition position P to the next acquisition position P' along the direction ds and the above distance |P–Q| is determined as the next acquisition position P':

$$|P-P'| \leq 2|P-Q| \quad (1)$$

Next, a method of calculating the next acquisition attitude will be described with reference to FIGS. 7 and 8. As shown in FIG. 7, if the present acquisition position of the measuring head 1 is designated by P, and the acquisition area the surface shape of which has been calculated based on the measured image data obtained at the acquisition position P is designated by S, the next acquisition attitude at the next acquisition position P' obtained by the above-mentioned method is calculated such that the reference axis Ra of the measuring head 1 is perpendicular to the acquisition area S. More specifically, as shown in FIG. 8, a line is drawn from the next acquisition position P' to the acquisition area S which corresponds to the measured image data obtained at the present acquisition position P and in the present acquisition attitude, the line extending parallel with a line drawn from the present acquisition position P to the position R corresponding to the present acquisition position P on the acquisition area S. Then, a point R' where the above line and the acquisition area S intersect is obtained, a perpendicular vector V' starting from the point R' is calculated, and an acquisition attitude permitting the reference axis Ra of the measuring head 1 to be coincident or parallel with the perpendicular vector V' is calculated as the next acquisition attitude. Here, a tangential plane at the point R' is calculated to obtain a normal vector at the tangential plane as the perpendicular vector V'.

Now, as shown in FIG. 8, for example, let it be assumed that a straight line representative of a measurement/scanning route, which extends from the present acquisition position P toward the next acquisition position P' along the direction ds on an x-z plane, is designated by ls, and the measuring head 1 is located at a position P'' slightly forward of the next acquisition position P' on the measurement/scanning route ls. Since the actual acquisition position is the position P'', it is preferable to correct the acquisition attitude to be taken at the next acquisition position which is obtained based on the measured image data acquired at the present acquisition position P and in the present acquisition attitude. This is because the acquisition attitude calculated to be taken at the next acquisition position P' is sometimes inappropriate for an acquisition attitude at the acquisition position P''. This correction of the acquisition attitude is carried out based on the amount of deviation of the position P'' from the next acquisition position P'. As stated above, if the measuring head 1 is located at the position P'' slightly forward of the next acquisition position P', a line is drawn from this position P'' to the acquisition area S which corresponds to the measured image data obtained in the acquisition position P and the acquisition attitude taken there, the line extending parallel with a line drawn from the present acquisition position P to the position R corresponding to the present acquisition position P on the acquisition area S, and a point R'' where the above line and the acquisition area S intersect is determined. Then, a tangential plane at the point R'' is calculated and a normal vector on this tangential plane is determined as the perpendicular vector V''. Further, the acquisition attitude at the acquisition position P'' is modified such that the reference axis Ra of the measuring head 1 becomes coincident or parallel with the direction of inclination of the perpendicular vector V''.

Next, a specific example of a method of calculating the surface shape of an overlapping area portion of two adjacent acquisition areas S and S' will be described in detail with reference to FIG. 9. In calculating the surface shape of the overlapping area portion of the two adjacent acquisition areas S and S', as described above, the surface shapes of the respective overlapping area portions of the two adjacent acquisition areas are extracted, and the extracted surface shapes are synthesized, to thereby calculate the surface shape of the overlapping area portions of the two adjacent acquisition areas S and S'.

Referring to FIG. 9, in the present embodiment, as the overlapping area portion of the two adjacent acquisition areas S and S', an area portion (hatched area in the figure) existing between a position R corresponding to the acquisition position P in the acquisition area S and a position R' corresponding to the acquisition position P' in the acquisition area S' is determined, and the surface shape of the overlapping area portion of the two adjacent acquisition areas S and S' is calculated based on a ratio between a distance from the position R in the acquisition area S to an object position in the overlapping area portion and a distance from the object position to the position R' in the other acquisition area S'. The term "object position" is used herein to mean a position on an overlapping area portion of two adjacent acquisition areas S and S', which is used as a candidate position in calculating the surface shape of the overlapping area portion. Now, if a height (z coordinate) of the acquisition area S is represented by a function of A (x, y), and the x-y coordinate value of the position R in the acquisition area S is represented by (x1, y) while a height (z coordinate) of the acquisition area S' is represented by a function of B (x, y), and the x-y coordinate value of the position R' in the acquisition area S' are represented by (x2, y), the height (z coordinate) of the area portion (hatched area in the figure) existing between the position R in the acquisition area S and the position R' in the acquisition area S' can be obtained by a function H (x, y) represented by the following equation (2). The surface shape of the area portion (hatched area in the figure) existing between the position R in the acquisition area S and the position R' in the acquisition area S' can be determined from the function H (x, y):

$$H(x, y) = [|x2-x|\cdot A(x, y) + |x1-x|\cdot B(x, y)]/|x2-x1| \qquad (2)$$

As described above, the surface shape of the overlapping area portion of the two adjacent acquisition areas S and S' is calculated based on the ratio between the distance from the position R in the acquisition area S to an object position in the overlapping area portion and a distance from the object position to the position R' in the other acquisition area S'. Therefore, it is possible to eliminate a discontinuity in the overlapping area portion of the two adjacent acquisition areas S and S', whereby the measurement of the surface to be inspected 5a provides a surface shape which is smooth and has no discontinuity.

Next, the procedures of a scanning attitude control process and a surface shape calculation process carried out by the image processing control device 8 will be described with reference to FIGS. 3 and 4. It should be noted that description of the correction of the acquisition attitude, described above, is omitted here.

When a measuring operation is started, the image processing control device 8 executes, in a parallel manner, a scanning attitude control task for controlling the attitude of the measuring head 1, and a surface shape calculation process task for calculating the surface shape of the surface to be inspected 5a based on measured image data acquired by the measuring head 1.

In the scanning attitude control task, as shown in FIG. 3, first, an initialization process is carried out at a step S11. In this initialization process, an acquisition position control signal for positioning the measuring head 1 to an initial acquisition position, and an acquisition attitude control signal for holding the measuring head 1 in an initial acquisition attitude are generated. Then, the process proceeds to a step S12, wherein an acquisition attitude and data required for calculation of an acquisition attitude generated by the surface shape calculation process task, referred to hereinafter, are acquired. The data acquired at this step include data indicative of calculated surface shapes. Further, the data acquired through the surface shape calculation process task include data for returning the measuring head 1 to the initial acquisition position and the initial acquisition attitude when the scanning is completed.

Then, the process proceeds to a step S13, wherein the next acquisition position is calculated based on the data obtained at the step S12 to generate an acquisition position control signal for driving the moving table 2c such that the point of intersection between the optical axis Oa of the beam in the measuring head 1 and the reference surface 1e is moved to the calculated next acquisition position. At the next step S14, an acquisition attitude to be taken at the next acquisition position is calculated by using the data obtained at the above step S12, and an acquisition attitude control signal is generated for driving the attitude-varying mechanism 3 such that the reference axis Ra in the measuring head 1 agrees with the calculated acquisition attitude.

Then, the process proceeds to a step S15, wherein the above-mentioned acquisition position control signal is delivered to the scanning driver 9. Responsive to this control signal, the scanning driver 9 drives the moving table 2c of the scanning system 2 such that the measuring head 1 is moved to the next acquisition position. At the next step S16, the acquisition attitude control signal described above is delivered to the attitude-varying driver 10. The attitude-varying driver 10 uses the acquisition attitude control signal to drive the attitude-varying mechanism 3 such that the reference axis Ra in the measuring head 1 agrees with the calculated acquisition attitude.

Next, the process proceeds to a step S17, wherein it is determined whether or not scanning has been completed, depending on whether or not the data for returning the measuring head 1 to the initial acquisition position and the initial acquisition attitude after completion of the scanning has been obtained through the surface shape calculation process task at the step S12. If the scanning has not yet been completed, the process proceeds to the step S12, wherein data required for calculating the next acquisition position and acquisition attitude is acquired. When it is determined that the scanning has been completed, the process is terminated.

In the surface shape calculation process task, as shown in FIG. 4, first, an initialization process is carried out at a step S21. In this initialization process, clearing of a memory storing measured image data and calculated surface shapes, inputting of measurement conditions, setting of the initial acquisition position and initial acquisition attitude of the measuring head 1 in accordance with the input measurement conditions, etc. are carried out.

Then, the process proceeds to a step S22, wherein measured image data acquired by the measuring head 1 is inputted. At the next step S23, the measured image data acquired is analyzed, and the surface shape of an acquisition area corresponding to the measured image data, in the surface to be inspected 5a is calculated. This calculated surface shape is represented by a three-dimensional coordinate value (z, y, z) defined beforehand on the flat surface of the optical table 6. The three-dimensional coordinate value (x, y, z) is stored in the memory. Then, the process proceeds to a step S24, wherein data required for calculating the next acquisition position and acquisition attitude is generated based on the acquired measured image data or the calculated surface shape, and the generated data is passed to the scanning control task. At this time, if the measured image data acquired at the step S22 has been acquired at the last acquisition position, it means that the scanning has been completed, and hence the data required for calculating the next acquisition position and acquisition attitude is data for returning the measuring head 1 to the initial acquisition position and the initial acquisition attitude.

Then, the process proceeds to a step S25, wherein it is determined whether or not scanning of the surface to be inspected 5a has been completed, depending on whether or not the measured image data acquired at the step S22 has been acquired at the final acquisition position. When the scanning of the surface to be inspected 5a has not yet been completed, the process returns to the above step S22, wherein measured image data at the next acquisition position is acquired, and the step S23 and the subsequent steps are repeatedly carried out. On the other hand, when it is determined at the step S25 that the scanning of the surface to be inspected 5a has been completed, the process proceeds to a step S26.

At the step S26, there is calculated the surface shape of an overlapping area portion of each pair of adjacent ones of acquisition areas which have surface shapes obtained from the measured image data acquired at respective acquisition positions. More specifically, surface shapes corresponding to the above overlapping area portion are extracted from the respective surface shapes of two adjacent acquisition areas, and the extracted surface shapes are synthesized with each other to thereby calculate the surface shape of the overlapping area portion. Then, the process proceeds to a step S27, wherein the surface shape of the whole surface to be inspected 5a including the surface shape of the area portions calculated at the step S26 is outputted to the monitor 11 or a printer, followed by terminating the process.

As described above, according to the present embodiment, the next acquisition position is calculated by using a surface shape which is calculated based on measured image data acquired at the present acquisition position and in the present acquisition attitude, and the moving table 2c is driven such that the point of intersection R0 between the optical axis Oa of the beam in the measuring head 1 and the reference surface 1e is moved to the calculated next acquisition position. Further, the acquisition attitude of the measuring head 1 at the next acquisition position is calculated by using the surface shape obtained at the present acquisition position and in the present acquisition attitude, and the attitude-varying mechanism 3 is driven such that the reference axis Ra in the measuring head 1 agrees with the calculated acquisition attitude. Therefore, as is distinct from the conventional analyzer, there is no need to execute a preparatory measurement to obtain the control variable of the measuring head 1, which makes it possible to drastically shorten a time period required for measuring the surface shape of the surface to be inspected 5a.

(Second embodiment)

Next, a second embodiment according to the present invention will be described with reference to FIG. 10.

Figure 10:
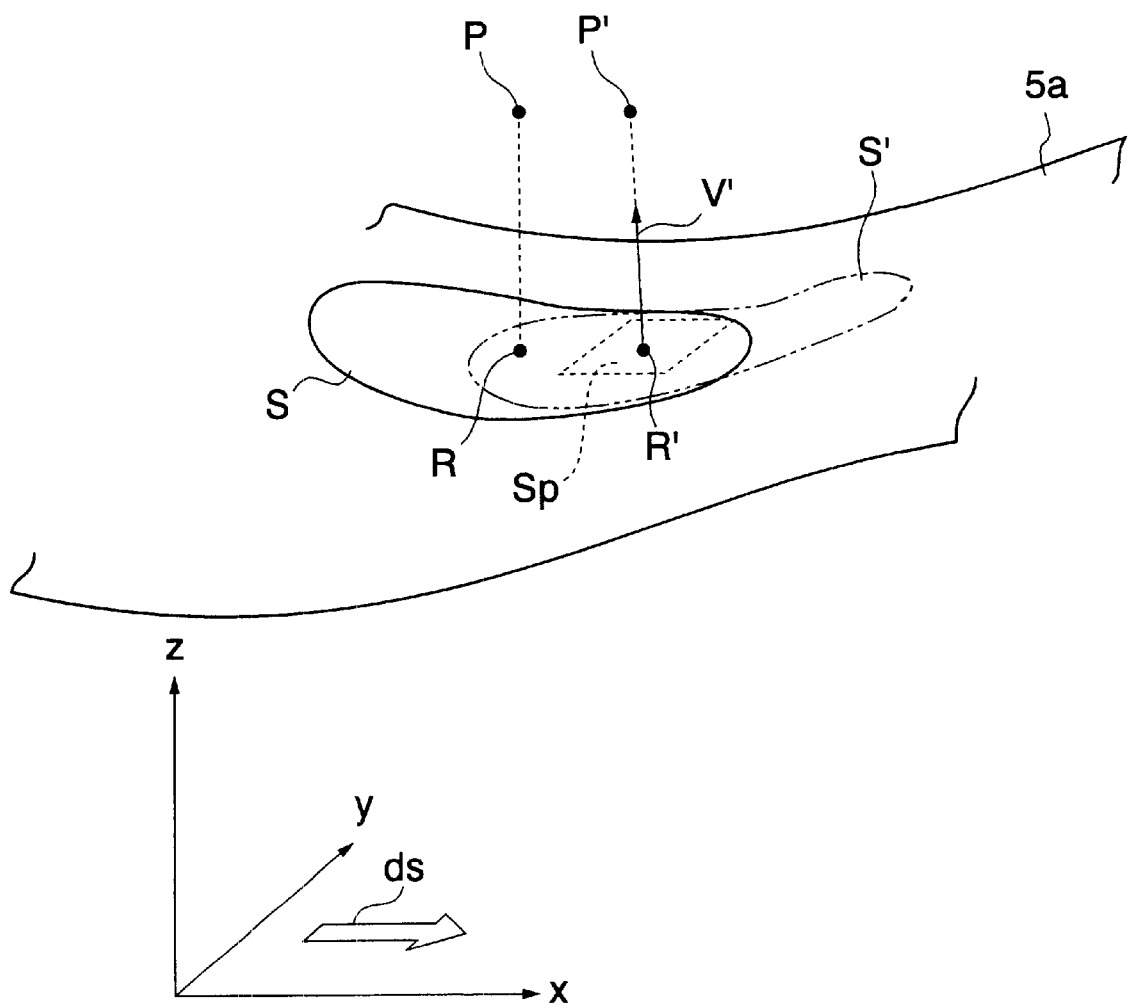
FIG. 10 is a diagram schematically showing a method of calculating an acquisition attitude of a measuring head at a next acquisition position thereof, which is carried out by a scanning wide-area surface shape analyzer according to a second embodiment of the present invention.

FIG. 10 is a diagram schematically showing a method of calculating the acquisition attitude of the measuring head at the next acquisition position thereof, which is carried out by a scanning wide-area surface shape analyzer according to the second embodiment.

As shown in FIG. 10, the present embodiment is distinguished from the above described first embodiment in that the point of intersection R' between a line extending from the next acquisition position P' toward an acquisition area S in parallel with a line drawn from the present acquisition position P to the Position R corresponding to the present acquisition position P on the acquisition area S and the acquisition area S is determined, that an approximate plane Sp is calculated by the least squares method based on the three-dimensional coordinate values of the position R' and positions around and close to the position R', that a normal vector V' on this approximate plane Sp is calculated, and that an acquisition attitude in which the reference axis Ra of the measuring head 1 is coincident or parallel with the normal vector V' is calculated as the next acquisition attitude. It should be noted that except for the above, the present embodiment is identical in construction and operation as the first embodiment, and description thereof is omitted.

Since the analyzer according to the second embodiment is constructed as above, the normal vector V' which represents the acquisition attitude of the measuring head 1 relative to the surface to be inspected 5a can be calculated with higher accuracy without being adversely affected by uneven high-frequency components of the acquisition area S, and further it is possible to further increase the parallelism between the reference surface 1e of the interferometer of the measuring head 1 and the corresponding acquisition area S' in the surface to be inspected 5a at the next acquisition position P'.

(Third embodiment)

Figure 11A:
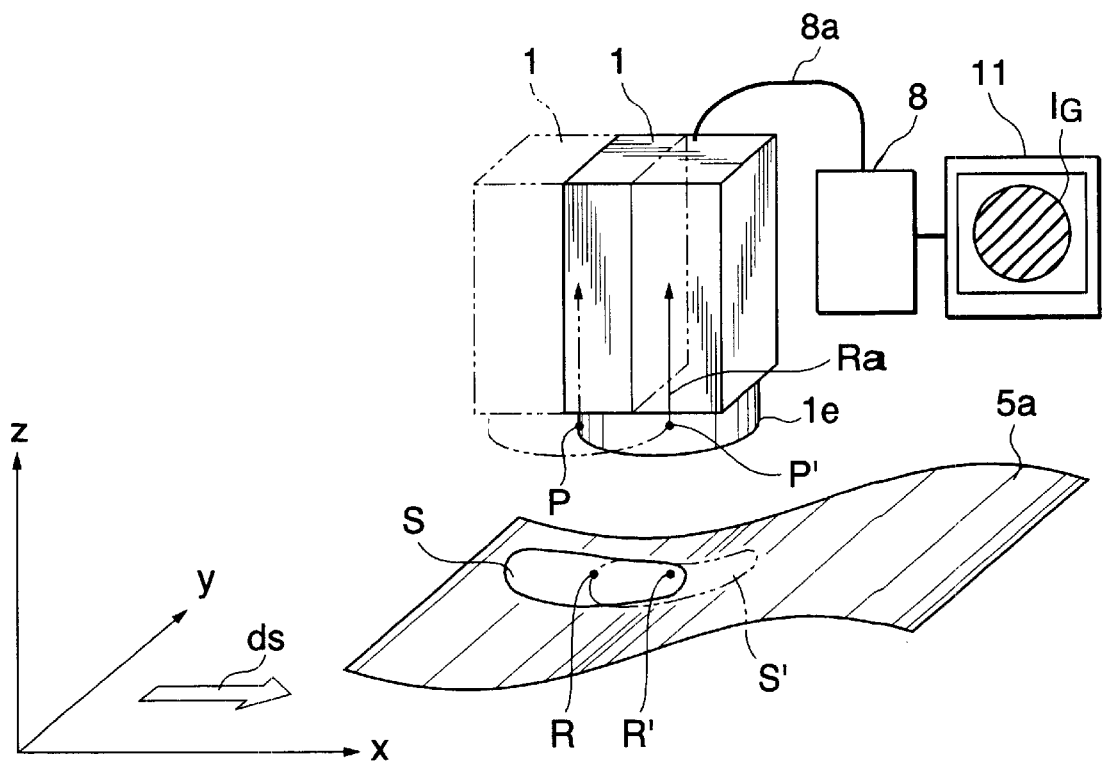
FIG. 11A is a diagram schematically showing a method of calculating the acquisition attitude of a measuring head at a next acquisition position when the calculated number of optical interference fringes is equal to or smaller than a predetermined number, which is carried out by a scanning wide-area surface shape analyzer according to the third embodiment of the invention.
Figure 11B:
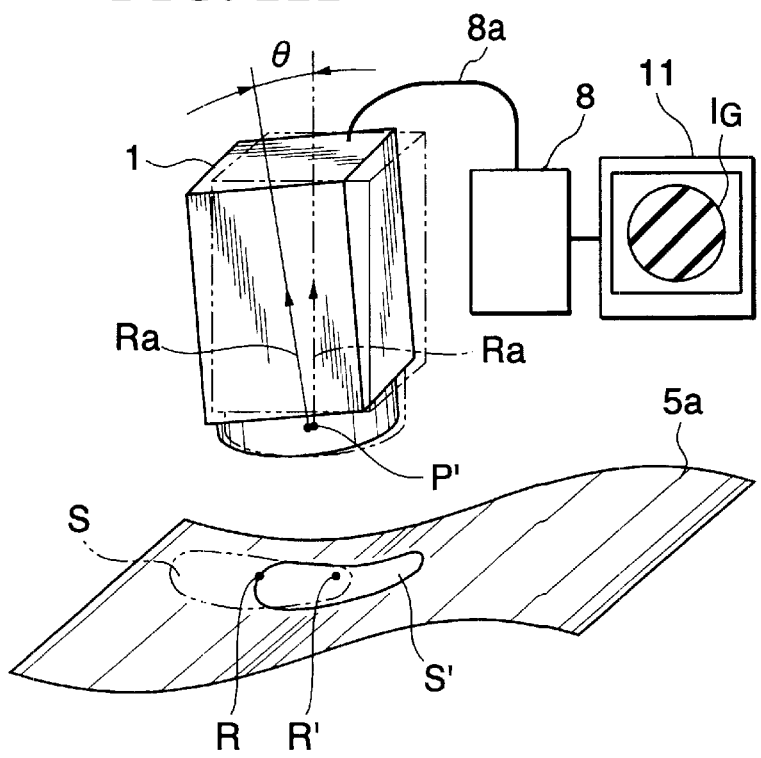
FIG. 11B is a diagram schematically showing a method of calculating the acquisition attitude of a measuring head at the next acquisition position when the calculated number of optical interference fringes is larger than the predetermined number, which is carried out by the scanning wide-area surface shape analyzer according to a third embodiment of the present invention.

Next, a third embodiment according to the present invention will be described with reference to FIGS. 11A and 11B. FIG. 11A is a diagram schematically showing a method of calculating the acquisition attitude of the measuring head at the next acquisition position when the calculated number of optical interference fringes is equal to or smaller than a predetermined number, which is carried out by a scanning wide-area surface shape analyzer according to the third embodiment. FIG. 11B is a diagram schematically showing a method of calculating the acquisition attitude of the measuring head at the next acquisition position when the calculated number of optical interference fringes is larger than the predetermined number, which is carried out by the scanning wide-area surface shape analyzer according to the third embodiment.

The present embodiment is distinguished from the first embodiment in that the acquisition attitude of the measuring head 1 is calculated after the measuring head 1 has been moved to the next acquisition position P'. In the following, only points different of the present embodiment from the first embodiment will be described, and description of the same component parts and elements as those of the first embodiment is omitted.

In the present embodiment, as shown in FIG. 11A, when the measuring head 1 is moved from the present acquisition position P to the next acquisition position P' with the acquisition attitude at the acquisition position P being held, first, measured image data for calculating an acquisition area corresponding to the acquisition position P', in the surface to be inspected 5a is acquired by the measuring head 1. This acquired measured image data is input to the image processing control device 8 through the cable 8a. The image processing control device 8 causes the monitor 11 to display an interference fringe image IG indicated by the input measured image data, calculates the number of interference fringes included in the measured image data, and determines whether or not the calculated number of interference fringes is equal to or smaller than a predetermined number (three, for instance). If the calculated number of interference fringes is equal to or smaller than the predetermined number, the acquisition attitude at the acquisition position P is set as an acquisition attitude at the acquisition position P'. Then, measured image data is obtained at the acquisition position P' in the same acquisition attitude as that at the acquisition position P, and the surface shape of an acquisition area S' corresponding to the measured image data is analyzed and calculated based on the data.

On the other hand, if the calculated number of interference fringes is larger than the predetermined number, as shown in FIG. 11B, measured image data is obtained while the inclination of the reference axis Ra of the measuring head 1 and the direction of the inclination are sequentially varied at the acquisition position P'. Whenever the inclination of the reference axis Ra and the direction of the inclination are varied, the number of interference fringes is calculated based on the obtained measured image data, and it is determined whether or not the calculated number of interference fringes is equal to or smaller than a predetermined number (three, for instance). The above sequence of operations is repeatedly carried out until the number of interference fringes becomes equal to or smaller than the predetermined number. When an inclination of the reference axis Ra and a direction of the inclination are obtained which cause the number of interference fringes to be equal to or smaller than the predetermined number, the reference axis Ra is held at the inclination as well as in the direction. That is, the measuring head 1 is held in an acquisition attitude which causes the number of interference fringes to be equal to or smaller than the predetermined number. Then, measured image data is obtained in the acquisition attitude, and the surface shape of an acquisition area S' corresponding to the measured image data is analyzed and calculated based on the data.

What is claimed is:

1. A scanning wide-area surface shape analyzer comprising:

an optical table having a flat surface for placing an object to be inspected thereon;

measuring means having a light source, a reference surface, and an interferometer which projects a beam emitted from the light source onto the reference surface and a surface to be inspected of the object placed on the flat surface, thereby generating an optical interference fringe image formed by interference between reflected light from the reference surface and reflected light from the surface to be inspected, said measuring means acquiring the optical interference fringe image generated by the interferometer as measured image data;

scanning means having a scanning reference position thereof set to a point of intersection between an optical axis of the beam and the reference surface in said measuring means, for moving said measuring means in parallel with the flat surface such that the scanning reference position sequentially reaches each acquisition position used for said measuring means to acquire the measured image data;

attitude varying means for varying an acquisition attitude of said measuring means for acquiring the measured image data, such that a direction of inclination of a reference axis being a direction vector extending along the optical axis from the scanning reference position is changed relative to the surface to be inspected;

surface shape analyzing and calculating means for analyzing and calculating, based on the measured image data acquired at the acquisition position and in the acquisition attitude, a surface shape of an acquisition area corresponding to the acquisition position and the acquisition attitude, in the surface to be inspected; and control means for controlling driving of said scanning means and said attitude-varying means;

wherein said control means calculates a next acquisition position by using measured image data acquired at a present acquisition position and in a present acquisition attitude, and calculates an acquisition attitude to be taken at the calculated next acquisition position.

2. A scanning wide-area surface shape analyzer according to claim 1, wherein said control means obtains a position corresponding to an end position of the acquisition area in the surface to be inspected on a scanning line extending from the present acquisition position in a direction of scanning of said measuring means, based on a surface shape of the acquisition area in the surface to be inspected, which has been determined from the measured image data acquired at the present acquisition position and in the present acquisition attitude, and wherein said control means calculates the next acquisition position such that a distance from the present acquisition position to the next acquisition position becomes not more than two times as large as a distance from the present acquisition area to the obtained position corresponding to the end position of the acquisition area in the surface to be inspected.

3. A scanning wide-area surface shape analyzer according to claim 1, wherein said control means calculates a perpendicular vector at a point of intersection between a line drawn from the calculated next acquisition position toward the acquisition area in the surface to be inspected or toward an extended area of the acquisition area, and the acquisition area or the extended area of the acquisition area, said line extending parallel with the reference axis at the present acquisition position and in the present acquisition attitude, the acquisition area corresponding to the measured image data acquired at the present acquisition position and in the present acquisition attitude, and wherein said control means sets a direction of inclination of the reference axis which becomes coincident or parallel with the calculated perpendicular vector, to the acquisition attitude at the next acquisition position.

4. A scanning wide-area surface shape analyzer according to claim 3, wherein when said measuring means is moved to the next acquisition position, if a position to which said measuring means has been moved is slightly different from the calculated next acquisition position, said control means calculates a perpendicular vector at a point of intersection between a line drawn from the position to which said measuring means has been moved, toward the acquisition area in the surface to be inspected or toward an extended area of the acquisition area, and the acquisition area, said line extending parallel with the reference axis at the present acquisition position and in the present acquisition attitude, the acquisition area corresponding to the measured image data acquired at the present acquisition position and in the present acquisition attitude, and wherein said control means sets a direction of inclination of the reference axis which becomes coincident or parallel with the calculated perpendicular vector, to the acquisition attitude at the next acquisition position.

5. A scanning wide-area surface shape analyzer according to claim 1, wherein said control means determines a point of intersection between a line drawn from the calculated next acquisition position toward the acquisition area in the surface to be inspected and the acquisition area, the acquisition area corresponding to the measured image data acquired at the present acquisition position and in the present acquisition attitude, said line extending parallel with the reference axis at the present acquisition position and in the present acquisition attitude, calculates a least squares approximate surface based on the determined point of intersection and points close thereto, and sets a direction of inclination of the reference axis which becomes coincident or parallel with a normal vector on the calculated least squares approximate surface, to the acquisition attitude at the next acquisition position.

6. A scanning wide-area surface shape analyzer according to claim 1, wherein after said measuring means has been positioned to the next acquisition position, said control means calculates a number of optical interference fringes indicated by measured image data acquired at the next acquisition position, based on the measured image data, and sets an acquisition attitude in which the number of optical interference fringes becomes equal to or smaller than a predetermined number, to the acquisition attitude at the next acquisition position.

7. A scanning wide-area surface shape analyzer according to claim 1, wherein said surface shape analyzing and calculating means has an intermediate-area surface shape calculation function of calculating a surface shape of an overlapping area portion where two adjacent ones of acquisition areas corresponding to measured image data acquired at respective acquisition positions overlap, and wherein the intermediate-area surface shape calculation function comprises synthesizing surface shapes of the two adjacent ones of the acquisition areas, to thereby calculate the surface shape of the overlapping area portion.

8. A scanning wide-area surface shape analyzer according to claim 7, wherein the overlapping area portion whose surface shape is calculated by the intermediate-area surface shape calculation function exists between a first position corresponding to an acquisition position of one of the two adjacent ones of the acquisition areas and a second position corresponding to an acquisition position of another of the two adjacent ones of the acquisition areas, and wherein the intermediate-area surface shape calculation function comprises calculating a surface shape at an object position between the first position in the one acquisition area and the second position in the another acquisition area, by synthesizing a surface shape of the one acquisition area and a surface shape of the another acquisition area by using a weighting factor defined by a ratio between a distance from the first position in the one acquisition area to the object position and a distance from the object position to the second position in the another acquisition area.

* * * * *